Sept. 7, 1965 J. A. MARLAND ETAL 3,204,738
ONE-WAY CLUTCH
Filed May 24, 1961 3 Sheets-Sheet 1
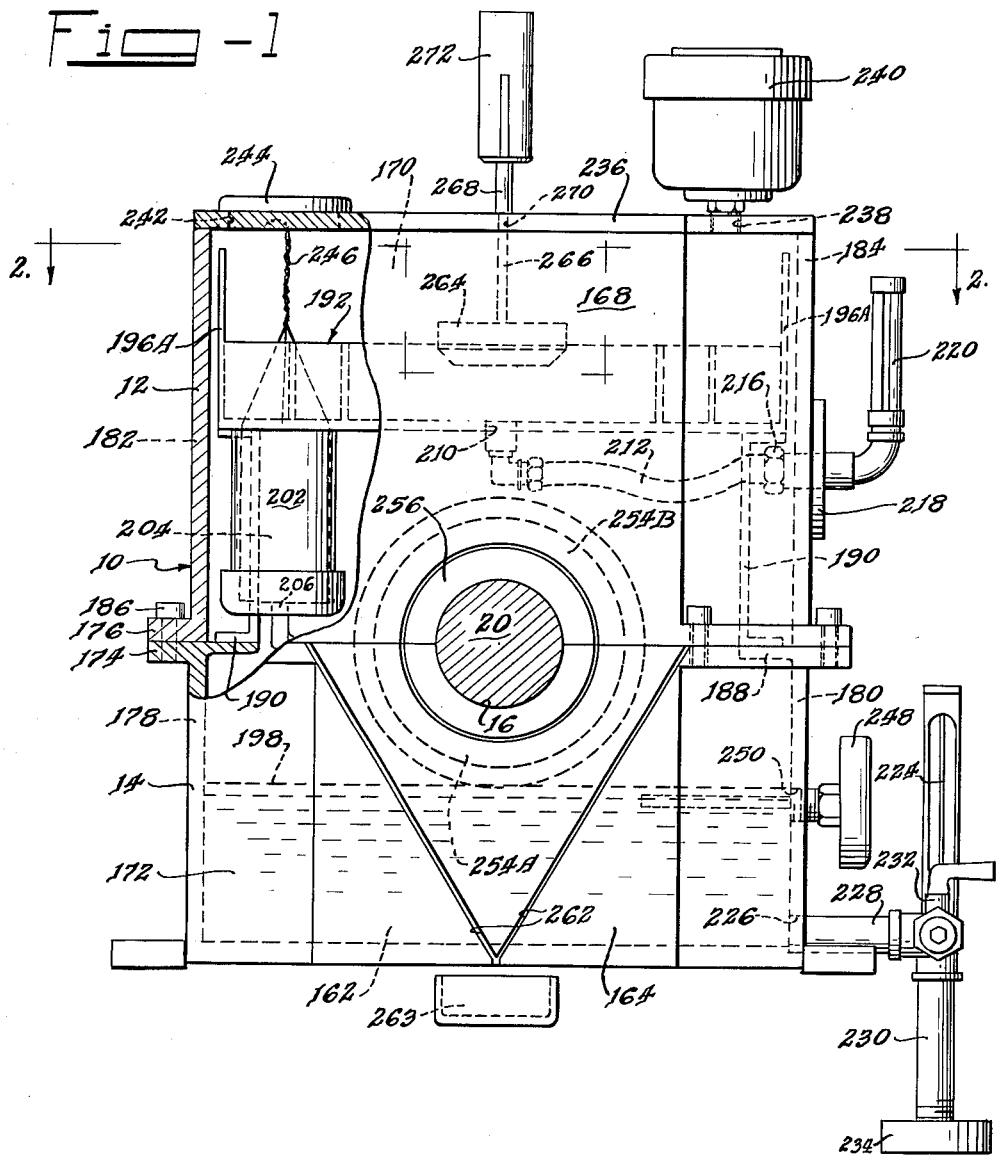
Inventors
Joseph A. Marland
Charles W. Hill
BY:
Stone, Nierman,
Burmeister & Zummer
Attorneys

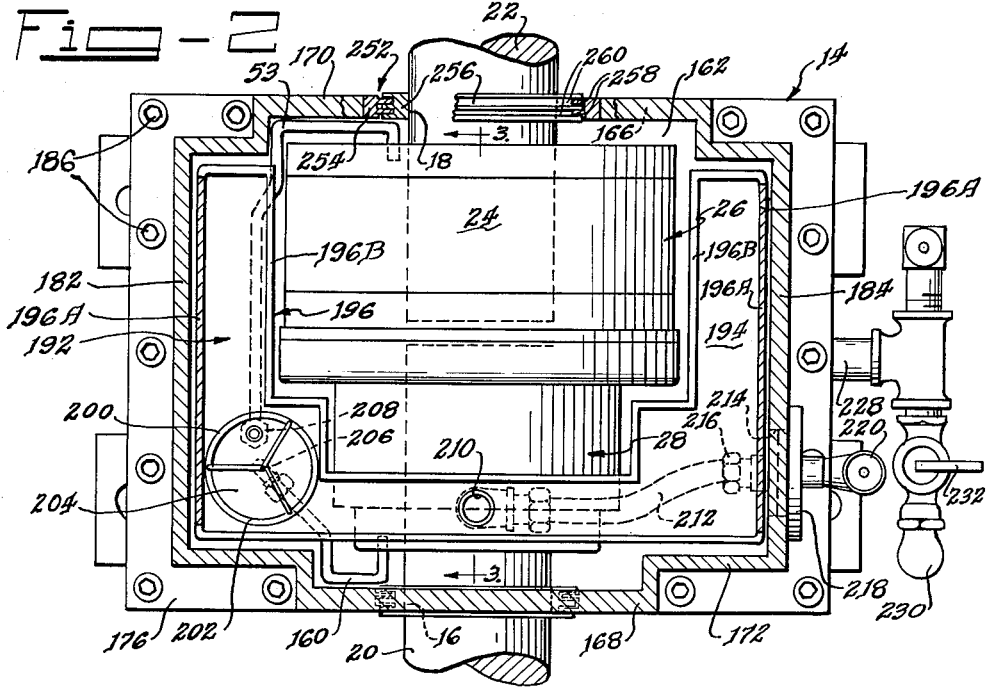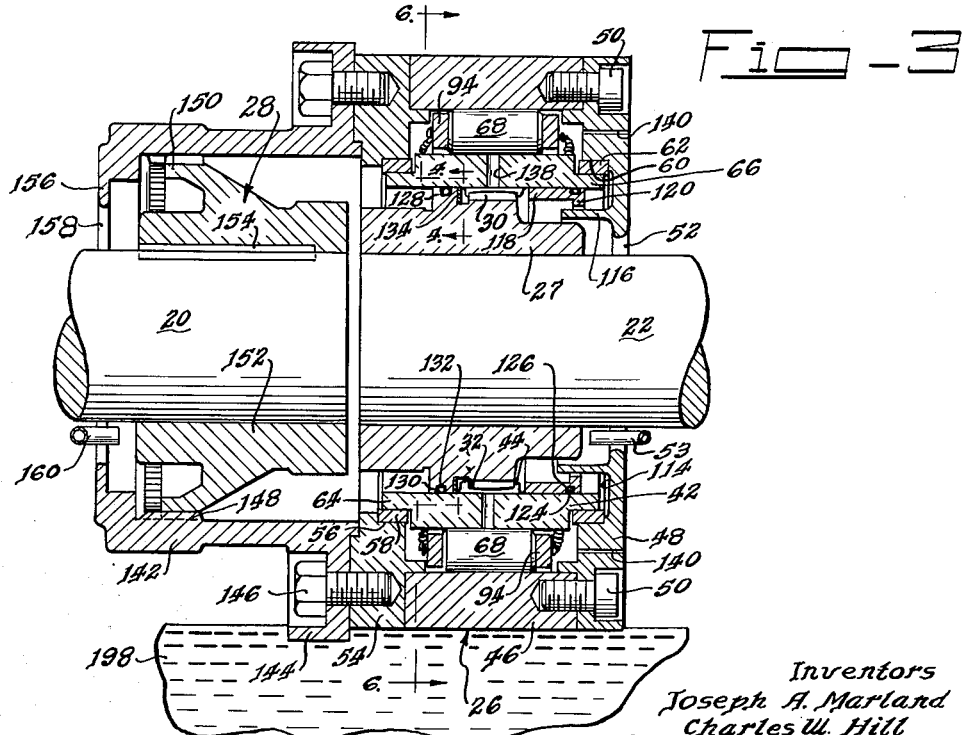

Sept. 7, 1965  J. A. MARLAND ETAL  3,204,738
ONE-WAY CLUTCH
Filed May 24, 1961  3 Sheets-Sheet 3
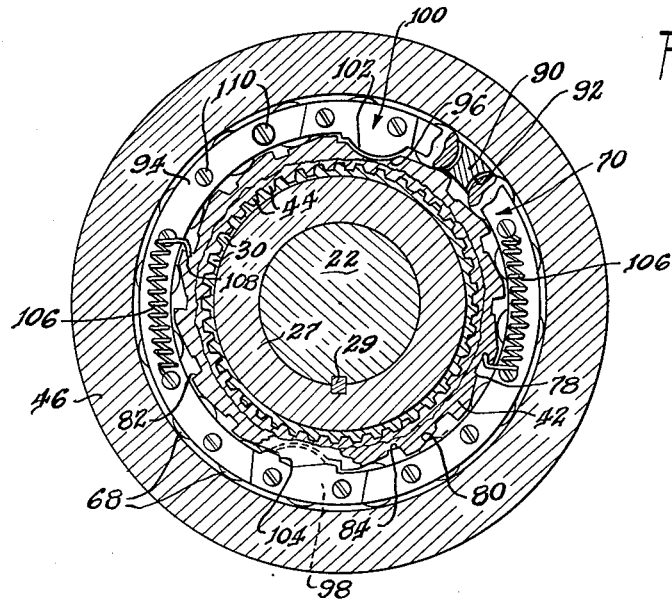
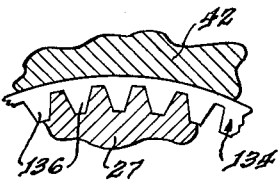
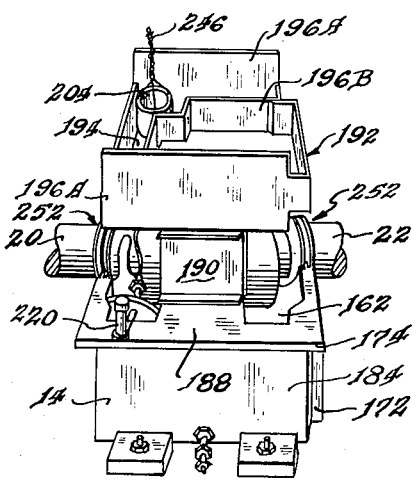
Inventors
Joseph A. Marland
Charles W. Hill
By: Stone, Nieman,
Burmeister & Zimmer
Attorneys

United States Patent Office 3,204,738
Patented Sept. 7, 1965

3,204,738
ONE-WAY CLUTCH
Joseph A. Marland, P.O. Box 308, Elm and Washington Aves., La Grange, Ill., and Charles W. Hill, La Grange, Ill.; said Hill assignor to said Marland
Filed May 24, 1961, Ser. No. 112,453
15 Claims. (Cl. 192—113)

The present invention relates to one-way clutches, and more particularly to the combination of a one-way clutch and housing for lubrication purposes.

One-way clutches are conventionally either of the roller bearing or sprag type. In both types, driving elements or wedges are disposed between coaxially mounted inner and outer races, and the driving elements become wedged between the races when torque is applied in one direction and disengage when torque is applied in the other direction. In the sprag type of clutch, the driving elements are of noncylindrical form, and the inner and outer races are cylindrical. In the roller type clutch, either inner or outer race is provided with indentations forming inclined planes, and the rollers rotate in these indentations, becoming wedged between the races for rotational torques in the driving direction. The present invention may be practiced with either the sprag type clutch or the roller bearing type clutch.

The patent application of the present inventor Marland entitled "One-Way Clutch," Serial No. 731,411, filed April 28, 1958, now Patent No. 2,998,113, discloses a roller bearing clutch provided with lubrication means. In the clutch disclosed in this patent application, a plurality of roller bearings are disposed between inner and outer races, and a lubrication tube extends from an oil reservoir into an annular opening coaxially disposed about the shaft coupled to the clutch to permit small drops of oil to fall within the clutch housing. These drops of oil work their way through the inner and outer races to adequately lubricate the roller bearings and the races.

A one-way clutch lubricated in this manner is entirely satisfactory unless operated in a particularly dirty or dusty atmosphere, in which case dirt enters through the opening in the clutch housing and creates a greasy sludge within the one-way clutch. Eventually, the clutch must be disassembled, and the dirt and residual oils cleaned from the clutch or the clutch will wear excessively. Also, moisture enters into the clutch housing through the oil opening, and under circumstances of high humidity, moisture has been found to cause a sludge to develop within the clutch housing. Further, maintenance workers occasionally permit the oil reservoir to run dry, and under there circumstances the clutch will not receive adequate lubrication.

The inventor Marland's patent application entitled "Torque Control Device," Serial No. 23,683, filed April 21, 1960, now Patent No. 3,123,193, discloses a clutch disposed within a housing which contains an oil reservoir in the lower portion thereof which contacts the exterior surface of the clutch, and a pair of oil reservoirs disposed in the walls of the housing above the level of the oil in the lower portion of the housing which catch the spray of oil caused by rotation of the clutch. Each of these latter oil reservoirs is connected to the main oil reservoir through a small opening which meters the flow of oil into the main portion of the housing and thereby limits the level of the oil in contact with the clutch. This construction prevents the oil bath from greatly impeding the rotation of the clutch, and at the same time effectively transfers the frictional heat developed in the clutch from the unit. The clutch itself is lubricated as a result of the oil spray which penetrates into the clutch.

It is an object of the present invention to provide a one-way clutch and housing assembly in which the clutch receives lubrication in a more definite and direct manner than merely lubrication as a result of the oil spray atmosphere present. Specifically, it is an object of the present invention to provide a one-way clutch and housing in which the clutch is lubricated by oil dripping from a tube into the clutch housing itself.

Many one-way clutches which utilize a tube extending from an oil reservoir into an annular opening in the clutch housing have been installed in either dirty locations or locations of excession moisture. It is an object of the present invention to provide a housing suitable for use with such clutches which essentially seals the clutch from the ambient atmosphere and assures dust and moisture conditions suitable for the operation of the clutch without impairing lubrication of the clutch.

These and further objects of the invention will be more readily apparent to those skilled in the art from a further consideration of this disclosure, particularly when viewed in the light of the drawings, in which:

FIGURE 1 is a front elevational view of a one-way clutch constructed according to the teachings of the present invention;

FIGURE 2 is a sectional view taken along the line 2—2 of FIGURE 1;

FIGURE 3 is a sectional view taken along the line 3—3 of FIGURE 2;

FIGURE 4 is a sectional view taken along the line 4—4 of FIGURE 3;

FIGURE 5 is a side elevational view of the clutch and housing assembly during the process of installation, the upper portion of the housing being removed; and FIGURE 6 is a fragmentary view taken along the line 6—6 of FIGURE 3.

The housing, designated 10, has an upper portion 12 and a lower portion 14. The housing 10 is provided with a pair of aligned openings 16 and 18, and a driven shaft 20 is journaled within the opening 16 and a driving shaft 22 is journaled within the opening 18. The two shafts 20 and 22 are coupled together by a clutch assembly 24, and the clutch assembly 24 has a one-way clutch 26 mechanically connected to a shaft self-aligning coupler 28.

In use, a source of power, such as an engine, is coupled to the driving shaft 22, and the load is coupled to the driven shaft 20. If the load is driven by some other source of energy than that coupled to the shaft 22, the shaft 22 remains stationary while the driven shaft 20 rotates freely. However, if the shaft 22 is provided with the power, the shaft 20 rotates with the shaft 22.

The one-way clutch 26 employs a sleeve 27 which is secured to the shaft 22 and maintained in rotational position by a key 29 disposed between the shaft 22 and the sleeve 27. The periphery of the sleeve 27 is provided with outwardly extending gear teeth 30, and the gear teeth 30 are provided with curved outer edges 32, the edges 32 curving toward the axis and the sleeve 27.

The clutch assembly 26 has a cylindrical inner race 42 which is provided with teeth 44 on its inner surface which are meshed with the teeth 30 of the sleeve 27. The inner race 42 is rotatably disposed within a cylindrical outer race 46, the outer race 46 forming a portion of the housing of the one-way clutch. A flat ring-shaped cover plate 48 is secured to the edge of the outer race 46 by bolts 50 spaced about the periphery of the cover plate 48, and the cover plate 48 extends close to the shaft 22 leaving an annular opening 52 for the introduction of oil from an oil tube 53, as illustrated in FIGURE 3. The outer race 46 and cover plate 48 form a casing for the clutch assembly. A flat ring 54 with a smaller inner diameter than the outer race 46 is secured normal to the outer race on the side thereof opposite the cover plate 48. The inner surface of the ring 54 is provided with a flat cylindrical surface 56 which engages a cylindrical bushing 58 with a generally rectangular cross-section. The cover plate 48 is also provided with a cylindrical surface 60 aligned with the shoulder 56, and a cylindrical bushing 62 similar to the bushing 58 is mounted on the surface 60. The inner race 42 has flat cylindrical extensions 64 and 66 which abut the bushings 58 and 62, respectively. The edges of the inner race 42 also abut the edges of the bushings 58 and 62, so that the bushings 58 and 62 maintain alignment of the inner race.

In this embodiment of the invention, the drive elements or clutch wedges are in the form of roller bearings 68. The roller bearings 68 are mounted in an assembly 70. The inner race 42 is provided with a plurality of indentations 78 which have two flat surfaces, a leading surface 80 and a trailing surface 82 which is disposed approximately at a right angle relative to the leading surface 80. The leading surface 80 of each indentation 78 is disposed at an angle less than 15 degrees relative to the tangential plane at the intersection of the outer surface of the inner race 42 and the leading surface 80 of the indentation 78. Each of the indentations 78 is also provided with a groove 84 extending across the leading surface 80 of the indentation 78 immediately adjacent to the trailing surface 82 thereof for the purpose of permitting free flow of oil.

One of the bearings 68 is disposed between each indentation 78 of the inner race 42 and the outer race 46. The roller bearings 68 have a diameter larger than the distance between the outer surface of the inner race 42 and the inner surface of the outer race 46, and smaller than the distance between the leading surface 80 of the indentations 78 of the inner race 42 at a distance from the trailing surface 82 of the indentation approximately equal to the radius of the roller bearing to the inner surface of the outer race 46. In this manner, the roller bearings 68 are free to rotate when disposed adjacent to the trailing surface 82 of the indentations 78, but wedge between the inner race 42 and outer race 46 when rolling away from trailing surface 82 of the indentations of the inner race 42.

In the assembly 70, each of the roller bearings 68 is separated from adjacent roller bearings by a cage member 90 which has partially cylindrical surfaces 92 confronting each of the adjacent roller bearings 68 and which conform to the roller bearings. Also, each of the cage members 90 is interconnected at its ends by end rings 94, the end rings 94 and cage members 90 maintaining each of the roller bearings 68 in proper position relative to the inner race 42. The cage members 90 and end rings 94 form a cage for each of the roller bearings 68, so that the roller bearings 68 are free to move only a small distance along radial planes since the concave surfaces 94 of the cage members 90 retain them in position.

The inner race 42 is provided with two pairs of parallel slots 96 and 98. These slots 96 and 98 are disposed parallel to each other in the same indentation 78, respectively, on opposite sides of the outer surface of the inner race 42 normal to the axis of the inner race 42. Also, the slots 96 are disposed in indentations 78 on opposite sides of the axis of the inner race 42 from the slots 98. A stop lug 100 is secured to the roller bearing assembly 70 confronting each of the slots 96 and 98, and the stop lug 100 is provided with an inwardly protruding portion 102 which is slidably accommodated within the slots 96 or 98. In addition, each stop lug 100 is provided with an inwardly protruding tooth 104 which is adapted to abut the trailing edge of the indentation carrying the slot 96 or 98. The slots 96 are thus disposed adjacent to the end rings 94 of the roller bearing assembly 70 opposite ends of the same roller bearing 68, and the slots 98 are likewise disposed adjacent to the end rings 94 of the same roller bearing 68.

The stop lugs 100 have two functions. When the clutch is operated in the direction of rotation, the teeth 104 of the stop lugs 100 abut the trailing surface 82 of the indentation 78 to limit the distance by which the roller bearings 68 may travel down the inclined planes or leading surfaces of the indentation 78, thus preventing the roller bearings 68 from abutting the trailing surfaces 82 of the indentation 78. In this manner, friction between the trailing surfaces of the indentations and the roller bearings 68 is substantially reduced. Also, since the protruding portions 102 of the stop lugs 100 are disposed within the slots 96, axial motion of the roller bearing assembly 70 relative to the inner race 42 is eliminated, thus assuring alignment of the roller bearing assembly 70 and the inner race 42. Since the roller bearing assembly 70 is in essence keyed to the inner race 42, the only necessary contact between the roller bearing assembly 70 and the outer race 46 is through the roller bearings 68. Hence, friction between the inner and outer races in the direction of rotation is minimized.

A pair of helical springs 106 are disposed on opposite sides of the axis of the inner race 42 on each side thereof to spring bias the roller bearing assembly 70 relative to the inner race 42 toward the locking position in order to insure engagement of the roller bearings 68 between the leading surfaces 80 of the indentations 78 and the outer race 46 when the clutch is in the rest position. The helical springs 106 have one end anchored within a bore 108 in the trailing surface 82 of indentations 78 on opposite sides of the axis of the inner race. The other end of the helical springs 106 is secured about a bolt 110 which is secured to the roller bearing assembly 70. The helical springs 106 form means to bias the rollers toward the intersection of the leading surface 80 and the outer surface of the inner race, and as a result, the "play" between the rest position of the clutch and the lock position of the clutch is greatly reduced.

While the end rings 94 may be secured to the roller cages 90 in any conventional manner, the applicant has found that a simple and very suitable way to accomplish this is to employ the bolts 110 for this purpose. The bolts 110 extend through the end rings 94, and the cage members 90, and are anchored in the end rings 94. In like manner, the bolts 110 may be employed to secure the stop lugs 100 to the roller bearing assembly 70.

The cylindrical extension 66 of the inner race 42 is disposed within an annular indentation 114 on the inner surface of the cover plate 48. A cylindrical portion 116 of the cover plate 48 extends from the indentation 114 coaxially with the shaft 20, and terminates between the sleeve 27 and the inner race 42. A cylindrical lubricant retainer 118 is secured to the inner surface of the inner race 42 and extends from the gear teeth 44 toward the cover plate 48. The retainer 118 has a ring portion 120 extending from the end thereof opposite the gear teeth 44 toward the axis of the shaft 20, and the ring portion 120 extends from the inner surface of the inner race 42 a distance slightly greater than that of the teeth 44 disposed on the inner surface of the inner race 42. The ring portion 120 is disposed between the cylindrical portion 116 of the cover plate 48 and the inner race 42 and spaced from the cylindrical portion 116 of the cover plate 48. The retainer 118 is provided with an annular groove 124 adjacent to the ring portion 120 and confronting the inner race 42. A sealing member 126, in the form of an O-ring, is disposed within the groove 124 and forms a fluid tight seal between the retainer 118 and the inner race 42. The O-ring 126 prevents a liquid lubricant from seeping between the inner race 42 and the retainer 118, and thereby makes it unnecessary in securing these members together to provide a fluid tight seal therebetween.

The sleeve 27 is provided with an annular shoulder 128 which extends toward the inner race 42 on the side of the gear teeth 44 opposite the retainer 118. The surface of the annular shoulder 128 which confronts the inner race 42 is provided with an annular groove 130, and a sealing ring 132, in the form of an O-ring, is disposed within the groove 130 in abutment with the inner race 42 and the sleeve 27. The ring 132 substantially retards leakage of oil from the gear teeth 44 past the shoulder 128.

Thus far, the elements have been described which will provide adequate lubrication of the shaft alignment means and one-way clutch when the unit is operating under load, that is, when the roller bearings 68 lock the inner race 42 to the outer races 46, and the inner and outer races rotate together about the shaft 20. Under these conditions, oil flows from the oiler 53 into the opening 52, thence across the cylindrical portion 116 of the cover plate 48 to the region between the sleeve 27 and the retainer 118. Since the ring portion 120 of the retainer 118 dams up the oil, the oil flows over the gear teeth 44 and 30 providing lubrication of these gear teeth. Further, the annular shoulder 128 and O-ring 132 make it certain that the level of the oil between the oil retainer 118 and the shoulder of the retainer 118 of the lowest portion of the clutch assembly will be sufficient to cover the gear teeth 44 and 30. Since the units is constantly rotating, all of the geer teeth 44 and 30 become lubricated.

In its free wheeling condition, the shaft 22 may be stationary, and the outer race 46 rotate about the inner race 42. Under these conditions, the retainer 118 will only lubricate those few gear teeth 44 and 30 disposed at the bottom of the clutch assembly 10 in its rest position. Nevertheless, friction will occur between the gear teeth 44 and 30 of the shaft alignment compensating means 14 during the free wheeling operation. For this reason, a serrated oil retaining washer 134 is disposed abutting the surface of the shoulder 128 confronting the teeth 30 of the sleeve 27, as illustrated in FIGURES 3 and 4. The serrated washer 134 may be constructed of neoprene and has teeth 136 which snugly fit between the teeth 44 disposed on the inner surface of the inner race 42. The serrated washer 134, as well as the O-ring 132 in the shoulder 128, provide a liquid seal preventing the flow of oil from the gear teeth 44 and 30 past the shoulder 128. The improved oil seal afforded by the serrated washer 134 is most desirable in the free wheeling condition to maintain the oil upon the gear teeth 44 and 30.

Oil for the gear teeth 44 and 30 leaks through radial holes 138 in the inner race 42 in the upper portions of the clutch assembly 10. The inner race 42 is provided with a plurality of these radial holes 138 at angular spaced intervals so that a number of these holes will be located in the upper portion of the clutch assembly regardless of the relative angle in which the clutch assembly 10 is disposed to permit oil to drain downwardly from the roller bearing assembly to the gear teeth 44 and 30. This oil will then be free to lubricate those gear teeth 44 and 30 which are located in the upper portions of the machine in the free wheeling operation. The number of the radial holes 138 should, however, be restricted to permit the retainer 118 to dam up oil during load operation. Further, a plurality of small channels 140 extend from adjacent to the outer race 46 through the cover plate 48 to permit excess oil to leak from the clutch 26.

The self-aligning coupler 28 has a hub 142 with a flange 144 at one end thereof which is mounted on the ring 54 of the one-way clutch 26 by bolts 146. The hub 142 has a plurality of teeth 148 which engage the teeth 150 of a sleeve 152 to lock the sleeve 152 to the hub 142. The sleeve 152 is secured to the shaft 20 by a key 154 so that the hub 142 rotates with the driven shaft 20.

The hub 142 has a lip 156 extending outwardly therefrom and toward the shaft 20, thus forming an annular opening 158 coaxially about the shaft 20. A second oil tube 160 extends into this opening 158. The oil tube 160 delivers drops of oil to the interior of the hub 142, and these drops of oil are free to migrate into the clutch 26, since the hub 142 has the same inner diameter as the ring 54 of the clutch.

Both the upper portion 12 and the lower portion 14 of the housing 10 has a generally rectangular cross-section and forms a generally rectangular cavity 162 therein. The lower portion 14 has a front face 164 and a back face 166, and these faces 164 and 166 extend upwardly to the center line of the openings 16 and 18, respectively, so that a semi-circular opening is disposed in the faces 164 and 166 of the lower portion 14 of the housing 10. In like manner, the upper portion 12 has a front face 168 and rear face 170 which contain semi-circular openings confronting and aligned with the openings in the lower faces to form the openings 16 and 18 for the driven shaft 20 and the driving shaft 22. The front faces 164 and 168 of the upper portion 12 and lower portion 14 of the housing 10 have indentations 172 adjacent to their outer edges which form a flange 174 on the lower portion 14 and a flange 176 on the upper portion 12. The flanges 174 and 176 also protrude outwardly from the sides 178 and 180 of the lower portion 14 and 182 and 184 of the upper portion 12. The flanges 174 and 176 are sealed together by bolts 186.

The sides 178 and 180 of the lower portion 14 of the housing 10 are provided with inwardly extending shelves 188 which support a mounting bracket 190 on each side. The mounting bracket 190 in turn supports an oil tray 192 which extends about the perimeter of the upper portion 12 of the housing. The oil tray 192 has a U shaped base 194 and upwardly extending walls 196 from the base to form a U shaped through for retaining oil. The tray 192 extends adjacent to the sides 182 and 184 and the front 168 of the upper portion 12 of the housing 10.

A body of oil is disposed in the lower portion 14 of the housing 10, this body of oil being designated 198 in FIGURE 1. The one-way clutch 26, which is of larger diameter than the self-aligning coupler 28, is partially immersed in the body 198 of lubricant, so that rotation of the clutch throws the lubricant about the interior of the housing 10. A portion of this lubricant is collected in the tray 192, thereby lowering the level of the body of lubricant 198 to provide skimming when the one-way clutch 26 rotates. The walls 196A of the tray 192 which are parallel to the axis of the clutch 26 extend above the other portions of the tray to aid in collecting sprayed oil into the tray.

The tray 192 is provided with a circular opening 200 in the corner thereof between the face 168 and the wall 182 of the upper portion 12 of the housing 10. A cup 202 which is provided with a fluid tight cylindrical wall and bottom sealed at its open end within the opening 200, and an oil strainer or filter 204 is disposed snuggly within the cylindrical cup 202. The oil strainer 204 may be of any conventional construction, such as the oil strainers or filters commonly used on automobiles and the like. The base of the cup 202 is provided with two openings 206 and 208 (FIGURE 2), and the opening 206 is connected to the oil tube 160 which communicates with the opening 158 in the self-aligning coupler 28, while the opening 208 is sealed to the oil tube 53 which communicates with the opening 52 in the one-way clutch 26. In this manner, oil from the tray 192 is caused to enter into the clutch 26 and coupler 28 by action of gravity, hence lubricating the clutch. Also, only filtered oil is returned to the clutch, thereby maintaining the interior of the clutch and coupler in a clean workable condition. Further, the oil from the clutch returns to the oil body 198 so that rotation of the clutch 26 skims the surface of this oil, rather than churns.

The base 194 of the oil trough 192 is maintained in a horizontal plane so that oil may flow freely from one end of the trough 192 to the other. Since a substantial part of the lubricant within the housing 10 is disposed within the trough 192 during normal operation, the level of the oil within this trough is important in determining whether or not an adequate lubricant supply has been maintained in the housing. Since the quantity of lubricant in the lower portion of the housing 10 is maintained by the skimming action of the clutch 26 at a particular level, measurement of the quantity of lubricant in the tray will determine the quantity of lubricant within the housing 10. For this reason, an aperture 210 is disposed in the base 194 of the tray adjacent to the face 168 of the upper portion 12 of the housing 10, and a flexible tube 212 is sealed in this aperture 210 at one end. The flexible tube is sufficiently long to extend from the aperture 210 through an aperture 214 in the side 184 of the upper portion 12 of the housing 10, and this end of the flexible tube 212 terminates in a screw type fitting 216. The screw type fitting 216 engages a collar 218 and is sealed therein by threaded engagement, and an oil level gauge 220 is mounted on the collar 218. The collar is also secured to the side 184 of the upper portion 12 of the housing 10, for example by bolts not shown.

The level of the body of lubricant 198 is also measured by an oil level indicator 224 which is connected to the lower portion 14 of the housing 10 through an aperture 226 located adjacent to the bottom thereof and a tube 228. The tube 228 also communicates with a downwardly extending capped pipe 230 through a valve 232. When it is desired to remove water from the housing, the water collects in the lowest portions of the housing and will drain into the capped pipe 230 when the valve 232 is opened. Thereafter, the valve 232 may be closed and the water and lubricant in the pipe 230 removed by removal of the cap 234.

It is also to be noted that the upper portion 12 of the housing has a top 236 which is provided with an aperture 238 to which is sealed a breather 240. The breather is of conventional construction, such as used on gasoline engines and the like, and contains a filter for permitting the transfer of air into and out of the housing 10 with changes in atmospheric pressure while minimizing the introduction of dirt and the like into the housing 10. In addition, the top 236 is provided with a second aperture 242 which is sealed by a cover 244. The second aperture 242 is disposed directly above the opening 200 for the strainer 204 or filter, and the strainer 204 has a handle 246 which extends almost to the cover 244. The cover may therefore be removed to permit cleaning or removal and replacement of the strainer 204 without disassembling the casing 10.

It is to be noted that in operation the level of the lubricant in the housing 10 can be determined without requiring operation of the unit to cease. It is also to be noted that dirt and moisture may be removed from the unit without requiring the unit operation to cease. These factors are of considerable importance for one-way clutches used in production facilities. Also, since the temperature at which a unit operates becomes important in production, a thermometer 248 is mounted in an aperture 250 in the side 180 of the lower portion 14 of the housing 10 and it extends therein.

The construction of the housing 10 is such that it may be installed upon a clutch and coupler assembly already in use. For this reason, labyringth seals 252 are disposed in the openings 16 and 18. Each of these seals 252 is composed of an outer ring 254 which is mounted in the opening of the housing and an inner ring 256 which is mounted on the shaft associated with that seal. The outer ring 254 is provided with a pair of spaced protruding rings 258 which are meshed within a pair of spaced circular indentations 260 which extend about the periphery of the inner ring 256.

When it is desired to install the housing 10 about a clutch and coupler assembly 24 which is in operation, it is necessary first to install the inner rings 256 on the shafts 20 and 22. The inner rings 256 have a slightly larger diameter than the shafts, so that they may be positioned along the length of the shaft, but there is insufficient clearance between the inner rings 256 and the shafts to provide a substantial leakage of lubricant. The outer rings 254 are composed of two semi-circular segments, illustrated as 254A and 254B in FIGURE 1, and the segment 254A is mounted within the portion of the opening 16 in the lower portion 14 of the housing 10. The lower portion 14 of the housing 10 is maneuvered into position so that the segment 254A of the outer ring 252 engages and accommodates the protruding portions of the inner ring 258 mounted on the shafts 20 and 22. Thereafter, the brackets 190 and the lubricant tray 192 are mounted on the lower portion 14 of the housing 10, and the oil tubes 53 and 160 are installed in proper position to drip oil into the openings 52 and 158 of the clutch and coupler assembly 24. Next, the upper portion 12 of the housing 10 is installed, and the flexible oil tube 212 is brought out through the opening 214 in the side 184. The collar 218 is then mounted on the end of the flexible oil tube 212 and sealed about the opening 214 in the side 184 of the casing 10, and the oil level indicator 220 is then sealed in the collar 218. The lubricant is then poured into the housing 10 and the unit placed in operation.

The labyrinth seal 254 provides a relatively tight seal between the housing 10 and the shafts 20 and 22, and this seal is sufficient to prevent moisture and dirt from entering through the seal into the housing, but a small amount of oil leakage will occur at this point. For this reason, one or more grooves 262 are placed on the exterior surface of the front and back faces of 164 and 166 of the lower portion of the housing 10 on a diagonal to the horizontal for the purpose of collecting oil seepage from the labyrinth seals 252. Oil seepage from the labyrinth seals will flow down these grooves 262 and drip into a container 263 positioned at the lower terminus of the grooves. Thus, by inspection, it can be determined that the labyrinth seals 252 are permitting excessive leakage and the seals may be repaired at a convenient time. As illustrated in FIGURE 1, two grooves 262 extend from the bottom of the lower portion 14 of the housing 10 diagonally upward to form a V-shape.

The walls of the lubricant tray 192 remote from the walls of the housing 10, designated 196B, are substantially shorter than the walls adjacent to the housing 10, thus limiting the height of the level of liquid lubricant in the tray 192. Under normal operation, the level of the lubricant in the tray 192 should be between the maximum and empty levels, since the filter 204 and tube 53 restrict lubricant flow from the tray 192. Excessive quantities of lubricant in the tray 192 indicate either that too much oil has been supplied to the unit or that the oil is not flowing properly through the oil tubes 53 and 160 to the clutch and coupler assembly 24. As described above, the oil level indicator 220 performs this function. FIGURE 1 also illustrates a float 264 which constitutes an alternate construction for accomplishing this measurement. The float 264 has a stem 266 which extends vertically upwardly from the float 264 into a sleeve 268 which passes through an aperture 270 in the top of the upper portion 12 of the housing 10. Sleeve 268 terminates in a viewing tube 272, and the end of the stem 266 is visible in this tube to give an indication of the position of the float.

From the foregoing disclosure, those skilled in the art will readily devise many other additional constructions within the intended scope of the present invention. It is, therefore, intended that the present invention be not limited by the foregoing disclosure, but rather only by the appended claims.

The invention claimed is:

1. A one-way clutch assembly comprising, in combination: a clutch having a generally cylindrical inner race; a generally cylindrical outer race disposed coaxially about the inner race; a plurality of drive elements disposed between the inner race and the outer race, rotational torque in one direction wedging the drive elements between the races and torque in the other direction releasing the drive elements; means for mounting the inner race coaxially about a shaft; a clutch casing constructed of materials impervious to the flow of fluid disposed about the races defining an annular opening of greater diameter than the shaft for accommodating the shaft, said casing having a leakage path for lubricant disposed outwardly from the annular opening; and means for introducing a liquid lubricant into the clutch casing comprising a fluid tight housing disposed about the clutch and defining a lubricant reservoir disposed beneath the clutch casing, a body of liquid lubricant disposed in the housing of sufficient volume to immerse a portion of the clutch casing, a tray open at the top disposed within the housing having a bottom with an aperture therein disposed above the lowest portion of the annular opening in the clutch casing, the capacity of said tray being sufficient to contain the portion of the body of liquid lubricant immersing the clutch casing, and means for conducting a flow of liquid lubricant from the tray to the clutch casing limited to a value less than the capacity of the leakage path of the clutch casing comprising a tube sealed within the aperture in the tray at one end and extending downwardly into the annular opening of the clutch casing, whereby rotation of the clutch casing sprays liquid lubricant within the housing causing a body of liquid lubricant to be formed in the tray, thereby reducing the quantity of the liquid lubricant and the level of the liquid lubricant in the reservoir to approach the lower level of the clutch casing.

2. A one-way clutch assembly comprising, in combination: a clutch having a generally cylindrical inner race; a generally cylindrical outer race disposed coaxially about the inner race; a plurality of drive elements disposed between the inner race and the outer race, rotational torque in one direction wedging the drive elements between the races and torque in the other direction releasing the drive elements; means for mounting the inner race coaxially about a shaft; and a clutch casing constructed of fluid tight materials disposed about the races defining an annular opening of greater diameter than the shaft and accommodating the shaft, said casing having a leakage path for lubricant disposed outwardly from the annular opening; and means for introducing a liquid lubricant into the clutch casing comprising a fluid tight housing disposed about the clutch and defining a lubricant reservoir disposed beneath the clutch casing, a body of liquid lubricant disposed in the housing of sufficient volume to immerse a portion of the clutch casing, a tray open at the top disposed on one side of the axis of the races having a bottom with an aperture therein disposed above the lowest portion of the annular opening in the clutch casing, said tray having two walls extending upwardly from the bottom disposed in planes generally parallel to the axis of the races, the planes of said walls being at different distances from the axis of the races, and the said wall adjacent to the axis of the races extending a shorter distance above the aperture in the bottom than the said wall remote from said axis, the capacity of said tray being sufficient to contain the portion of the body of liquid lubricant above the lower level of the clutch casing when the clutch casing is at rest, and means for conducting a flow of liquid lubricant from the tray to the clutch casing limited to a value less than the capacity of the leakage path of the clutch casing comprising a tube sealed within the aperture in the casing at one end and extending downwardly into the annular opening of the clutch casing, whereby rotation of the clutch casing sprays liquid lubricant within the housing causing a body of liquid lubricant to be formed in the tray, thereby reducing the quantity of lubricant in the reservoir and the level of liquid lubricant in the reservoir to approach the lower level of the clutch casing.

3. A one-way clutch assembly comprising the elements of claim 1 wherein the tray is U-shaped and has a portion disposed on each side of the axis of the races, said tray having a horizontal bottom disposed above the lowest level of the annular opening in the clutch casing, the portions of the tray on the sides of the axis of the races having walls remote from the axis extending further from the bottom than the walls adjacent to the axis of the races.

4. A one-way clutch assembly comprising, in combination: a clutch having a generally cylindrical inner race, a generally cylindrical outer race disposed coaxially about the inner race, a plurality of drive elements disposed between the inner race and the outer race, rotational torque in one direction wedging the drive elements between the races and torque in the other direction releasing the drive elements; a shaft coaxially mounted within the inner race; a casing defining an annular opening of greater diameter than the shaft, said casing having a leakage path for lubricant disposed outwardly from the annular opening for accommodating the shaft; constructed of fluid tight materials a sealed housing having an upper portion and a lower portion disposed about the clutch and defining a lubricant reservoir disposed beneath the clutch casing, said housing having semi-circular openings in the upper portion and lower portion aligned with each other and the shaft extending through said semi-circular openings; sealing means disposed in the semi-circular openings for rotatably sealing the shaft to the housing, said sealing means having two independent parts, one of said independent parts being mounted on the lower portion of the housing and the other independent part being mounted on the upper portion of the housing; a body of liquid lubricant disposed within the housing of sufficient volume to immerse a portion of the clutch casing; a tray open at the top disposed within the housing on one side of the axis of the races having a bottom with an aperture therein disposed above the lowest level of the annular opening in the clutch casing, the capacity of said tray being sufficient to contain the portion of the body of liquid lubricant above the lower level of the clutch casing; and means for conducting a flow of liquid lubricant from the tray to the clutch casing limited to a value less than the capacity of the leakage path of the clutch casing comprising a tube sealed within the aperture in the tray at one end and extending downwardly into the annular opening of the clutch casing, whereby rotation of the clutch casing sprays lubricant in the housing causing a body of liquid lubricant to be formed in the tray, thereby reducing the quantity of liquid lubricant and the level of the liquid lubricant in the reservoir to approach the lower level of the clutch casing.

5. A one-way clutch comprising the elements of claim 5 wherein the independent parts of the seal mounted on the upper and lower portions of the housing are provided with outwardly extending semi-rings which are disposed in parallel planes normal to the axis of the shaft, and an annular member is disposed about the shaft and provided with circular indentations accommodating the semi-rings mounted on the housing.

6. A one-way clutch assembly comprising the elements of claim 4 in combination with means for mounting the tray on the lower portion of the housing.

7. A one-way clutch assembly comprising the elements of claim 1 in combination with a lubricant filter disposed in series with the tube extending from the aperture in the tray and the clutch casing opening.

8. A one-way clutch assembly comprising the elements of claim 1 wherein a cup is disposed below the aperture in the tray and sealed therein, said cup having an aperture in the lower portion thereof and the tube being sealed within the aperture at its one end, and an oil filter disposed within the cup.

9. A one-way clutch assembly comprising the elements of claim 1 in combination with means for measuring the level of the lubricant within the tray.

10. A one-way clutch assembly comprising the elements of claim 1 wherein the tray is provided with a second aperture therein disposed in the bottom thereof and a transparent viewing tube is mounted on the exterior of the housing, said housing having an opening therein adjacent to the viewing tube and a lubricant conduit extending from the viewing tube to the second aperture in the tray, whereby liquid lubricant will enter the viewing tube and the level of the liquid lubricant in the viewing tube will indicate the level of the liquid lubricant in the tray.

11. A one-way clutch assembly comprising the elements of claim 1 in combination with a float disposed within the tray and adapted to float upon the lubricant therein, the housing having an aperture directly above the float, a stem mounted vertically on the float and extending through the aperture of the housing, and a transparent sleeve mounted within the aperture of the housing and disposed about the stem, whereby the position of the stem within the transparent sleeve is an indication of the level of the lubricant in the tray.

12. A one-way clutch assembly comprising the elements of claim 1 wherein the tray is provided with a second aperture in the bottom thereof and the housing is provided with an opening below the level of the bottom of the tray, a flexible tube sealed at one end within the second aperture of the tray and extending to the exterior of the housing through the opening therein, a collar sealed about the end of the flexible tube opposite the second aperture in the tray, a viewing tube sealed to the collar and extending upwardly therefrom, and means for sealing the collar about the opening in the housing.

13. A one-way clutch assembly comprising, in combination: a clutch having a generally cylindrical inner race, a generally cylindrical outer race disposed coaxially about the inner race, a plurality of drive elements disposed between the inner race and the outer race, rotational torque in one direction wedging the drive elements between the races and torque in the other direction releasing the drive elements; a first shaft coaxially mounted within the inner race; a casing constructed of fluid tight materials mounted on the outer race defining an annular opening of greater diameter than the shaft for accommodating the shaft, said casing having a leakage path for lubricant disposed outwardly from the annular opening; a self-aligning shaft coupler having a hub with an opening at one end and mounted on the casing at the other end, said hub having a plurality of teeth extending from the interior surface thereof; a sleeve disposed within the hub having outwardly extending teeth meshed with the teeth of the hub; a second shaft of smaller diameter than the opening in the hub coaxially mounted within the sleeve of the shaft coupler and extending through the opening in the hub; a sealed housing defining a lubricant reservoir disposed beneath the clutch casing, said housing having a first opening accommodating the first shaft and a second opening accommodating the second shaft; means disposed about the first and second shafts to seal the shafts to the housing; a body of liquid lubricant disposed in the housing of sufficient volume to immerse a portion of the clutch casing, a tray open at the top disposed on one side of the axis of the races having a bottom with first and second apertures therein disposed above the lowest portion of the annular opening in the clutch casing, the capacity of said tray being sufficient to contain the portion of the body of liquid lubricant above the lower level of the clutch casing when the clutch casing is at rest, means for conducting a flow of liquid lubricant from the tray to the clutch casing limited to a value less than the capacity of the leakage path of the clutch casing comprising a tube sealed within the first aperture in the tray at one end and extending downwardly into the annular opening of the clutch casing; and a second tube sealed within the second aperture in the tray at one end and extending downwardly into the opening of the hub, whereby rotation of the clutch casing sprays the liquid lubricant within the housing causing a body of liquid lubricant to be formed in the tray, thereby reducing the quantity of lubricant and the level of the liquid lubricant in the reservoir to approach the lower level of the clutch casing.

14. A one-way clutch assembly comprising the elements of claim 1 wherein the housing is provided with a groove on the exterior surface thereof disposed at an acute angle to the horizontal plane and beneath the shaft sealing means, said groove terminating at the bottom of the casing in combination with a receptacle for collecting lubricant leakage flowing from the seal down the groove into the receptacle.

15. A one-way clutch assembly comprising the elements of claim 1 wherein the leakage path of the casing comprises a plurality of channels extending through the casing about the perimeter of the casing for permitting a restricted flow of oil from the interior of the casing.

References Cited by the Examiner

UNITED STATES PATENTS

| | | | |
|---|---|---|---|
| 1,350,119 | 8/20 | Staley | 269—15 |
| 1,382,532 | 6/21 | Newton. | |
| 1,819,606 | 8/31 | Jones | 192—61 X |
| 2,004,563 | 6/35 | Bogoslowsky | 277—56 X |
| 2,285,754 | 6/42 | Money. | |
| 2,808,140 | 10/57 | Trofimov. | |
| 2,884,107 | 4/59 | Frankel. | |
| 2,998,113 | 8/61 | Marland | 192—45 |

FOREIGN PATENTS 742,120　12/32　France.

DAVID J. WILLIAMOWSKY, *Primary Examiner.*

THOMAS J. HICKEY, *Examiner.*

UNITED STATES PATENT OFFICE
CERTIFICATE OF CORRECTION

Patent No. 3,204,738  September 7, 1965

Joseph A. Marland et al.

It is hereby certified that error appears in the above numbered patent requiring correction and that the said Letters Patent should read as corrected below.

Column 5, line 19, for "units" read -- unit --; column 6, line 27, for "through" read -- trough --; column 10, line 18, after "casing" insert -- constructed of fluid tight materials --; lines 21 and 22, strike out "for accommodating the shaft; constructed of fluid tight materials" and insert instead a semicolon.

Signed and sealed this 13th day of August 1968.

(SEAL)
Attest:

Edward M. Fletcher, Jr.

Attesting Officer

EDWARD J. BRENNER

Commissioner of Patents